(12) United States Patent
Cui et al.

(10) Patent No.: US 12,067,733 B2
(45) Date of Patent: Aug. 20, 2024

(54) VIDEO TARGET TRACKING METHOD AND APPARATUS, COMPUTER DEVICE, AND STORAGE MEDIUM

(71) Applicant: TENCENT TECHNOLOGY (SHENZHEN) COMPANY LIMITED, Shenzhen (CN)

(72) Inventors: Zhen Cui, Shenzhen (CN); Zequn Jie, Shenzhen (CN); Li Wei, Shenzhen (CN); Chunyan Xu, Shenzhen (CN); Tong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 403 days.

(21) Appl. No.: 17/461,978

(22) Filed: Aug. 30, 2021

(65) Prior Publication Data
US 2021/0398294 A1 Dec. 23, 2021

Related U.S. Application Data

(63) Continuation of application No. PCT/CN2020/088286, filed on Apr. 30, 2020.

(30) Foreign Application Priority Data
May 27, 2019 (CN) .......................... 201910447379.3

(51) Int. Cl.
*G06T 7/215* (2017.01)
*G06F 18/214* (2023.01)
(Continued)

(52) U.S. Cl.
CPC ............ *G06T 7/215* (2017.01); *G06F 18/214* (2023.01); *G06N 20/00* (2019.01); *G06T 7/11* (2017.01);
(Continued)

(58) Field of Classification Search
CPC . G06T 7/215; G06T 7/11; G06T 2207/10016; G06T 2207/20081;
(Continued)

(56) References Cited

U.S. PATENT DOCUMENTS 8,467,570 B2   6/2013  Ma et al.
2019/0355128 A1* 11/2019 Grauman ................ G06T 7/215

FOREIGN PATENT DOCUMENTS

CN   106127807 A    11/2016
CN   107886515   *   4/2018
(Continued)

OTHER PUBLICATIONS

Wang, Ye, et al. "Unsupervised video object segmentation with distractor-aware online adaptation." Journal of Visual Communication and Image Representation 74 (2018): 102953. (Year: 2018).*
(Continued)

*Primary Examiner* — Sean M Conner
*Assistant Examiner* — Stefano Anthony Dardano
(74) *Attorney, Agent, or Firm* — ANOVA LAW GROUP, PLLC

(57) ABSTRACT

A video target tracking method is provided to a computing device, the method includes: obtaining a partial detection map corresponding to a target image frame in a to-be-detected video; obtaining a relative motion saliency map corresponding to the target image frame; determining constraint information corresponding to the target image frame according to the partial detection map and the relative motion saliency map; adjusting a parameter of an image segmentation model by using the constraint information, to obtain an adjusted image segmentation model; and extracting a target object from the target image frame by using the adjusted image segmentation model.

17 Claims, 9 Drawing Sheets

(51) Int. Cl.
  *G06N 20/00* (2019.01)
  *G06T 7/11* (2017.01)
  *G06V 10/46* (2022.01)
  *G06V 20/40* (2022.01)

(52) U.S. Cl.
  CPC ............ *G06V 10/462* (2022.01); *G06V 20/46* (2022.01); *G06T 2207/10016* (2013.01); *G06T 2207/20081* (2013.01); *G06T 2207/20084* (2013.01); *G06V 2201/07* (2022.01)

(58) Field of Classification Search
  CPC . G06T 2207/20084; G06T 2207/20076; G06T 7/20; G06T 7/248; G06T 2207/20021; G06T 2207/20104; G06T 2207/20156; G06T 2207/20164; G06T 2207/30196; G06T 2207/30232; G06T 7/174; G06T 7/194; G06T 7/246; G06F 18/214; G06N 20/00; G06N 3/045; G06N 3/08; G06V 10/462; G06V 20/46; G06V 2201/07
  See application file for complete search history.

(56) References Cited

FOREIGN PATENT DOCUMENTS

| | | | |
|---|---|---|---|
| CN | 108122247 | A | 6/2018 |
| CN | 109035293 | A | 12/2018 |
| CN | 110176027 | A | 8/2019 |

OTHER PUBLICATIONS

Xiao, Huaxin, et al. "Monet: Deep motion exploitation for video object segmentation." Proceedings of the IEEE Conference on Computer Vision and Pattern Recognition. 2018. (Year: 2018).*
Voigtlaender, Paul, and Bastian Leibe. "Online adaptation of convolutional neural networks for the 2017 davis challenge on video object segmentation." The 2017 DAVIS Challenge on Video Object Segmentation-CVPR Workshops. vol. 5. No. 6. 2017. (Year: 2017).*
Wang, Ye, et al. "Unsupervised video object segmentation with distractor-aware online adaptation." Journal of Visual Communication and Image Representation 74 (2018): 102953. (Year: 2018) (Year: 2018).*
The World Intellectual Property Organization (WIPO) International Search Report for PCT/CN2020/088286 Jul. 1, 2020 6 Pages (including translation).
The European Patent Office (EPO) The Extended European Search Report for 20812620.1 Jun. 24, 2022 11 pages.
Ye Wang et al., "Unsupervised Video Object Segmentation with Distractor-Aware Online Adaptation," arXiv: 1812.07712v1, Dec. 19, 2018 (Dec. 19, 2018). 11 pages.
Paul Voigtlaender et al., "Online Adaptation of Convolutional Neural Networks for Video Object Segmentation," arXiv:1706.09364v2, Aug. 1, 2017 (Aug. 1, 2017). 16 pages.
S. Caelles et al., "One-Shot Video Object Segmentation," 2017 IEEE Conference on Computer Vision and Pattern Recognition (CVPR), IEEE Computer Society, US, Jul. 21, 2017 (Jul. 21, 2017), pp. 5320-5329 10 pages.
Suyog Dutt Jain et al., "FusionSeg: Learning to combine motion and appearance for fully automatic segmention of generic objects in videos," arXiv:1701.05384v1, Jan. 19, 2017 (Jan. 19, 2017). 10 pages.

* cited by examiner

VIDEO TARGET TRACKING METHOD AND APPARATUS, COMPUTER DEVICE, AND STORAGE MEDIUM

RELATED APPLICATION(S)

This application is a continuation application of PCT Patent Application No. PCT/CN2020/088286 filed on Apr. 30, 2020, which claims priority to Chinese Patent Application No. 2019104473793, entitled "VIDEO TARGET TRACKING METHOD AND APPARATUS, DEVICE, AND STORAGE MEDIUM" filed with the Chinese Patent Office on May 27, 2019, all of which are incorporated herein by reference in entirety.

FIELD OF THE TECHNOLOGY

The present disclosure relates to the field of image recognition technologies, and in particular, to a video target tracking method and apparatus, a computer device, and a storage medium.

BACKGROUND

A video target tracking technology often refers to tracking a target object of interest in a video, and recognizing the target object from an image frame of the video.

A video target tracking method may be based on semi-supervised learning. First, an image segmentation model is obtained through training by using some training samples. Then, a first image frame of a video is used for adjusting a parameter of the image segmentation model, so that the image segmentation model is applicable to extraction of a target object from the video. A position of target object in the first image frame may be manually marked. Subsequently, the target object is recognized from a subsequent image frame of the video by using the adjusted image segmentation model.

When an appearance difference between the first image frame and the subsequent image frame of the video is relatively large, the adjusted image segmentation model often cannot accurately recognize the target object from the subsequent image frame. In certain circumstances, as the appearance information changes, a prediction result of the model tends to be inaccurate.

SUMMARY

According to various embodiments of the present disclosure, a video target tracking method and apparatus, a computer device, and a storage medium are provided.

In one aspect, the present disclosure provides a video target tracking method, performed by a computer device, and the method including: obtaining a partial detection map corresponding to a target image frame in a to-be-detected video, the partial detection map being generated based on appearance information of a target object that is in the to-be-detected video and is to be tracked by an image segmentation model; obtaining a relative motion saliency map corresponding to the target image frame, the relative motion saliency map being generated based on motion information of the target object; determining constraint information corresponding to the target image frame according to the partial detection map and the relative motion saliency map, the constraint information including an absolute positive sample pixel, an absolute negative sample pixel, and an undetermined sample pixel in the target image frame; adjusting a parameter of the image segmentation model by using the constraint information, to obtain an adjusted image segmentation model; and extracting the target object from the target image frame by using the adjusted image segmentation model.

In another aspect, the present disclosure provides a video target tracking apparatus, including: a memory storing computer program instructions; and a processor coupled to the memory and configured to execute the computer program instructions and perform: obtaining a partial detection map corresponding to a target image frame in a to-be-detected video, the partial detection map being generated based on appearance information of a target object that is in the to-be-detected video and is to be tracked by an image segmentation model; obtaining a relative motion saliency map corresponding to the target image frame, the relative motion saliency map being generated based on motion information of the target object; determining constraint information corresponding to the target image frame according to the partial detection map and the relative motion saliency map, the constraint information including an absolute positive sample pixel, an absolute negative sample pixel, and an undetermined sample pixel in the target image frame; adjusting a parameter of the image segmentation model by using the constraint information, to obtain an adjusted image segmentation model; and extracting the target object from the target image frame by using the adjusted image segmentation model In yet another aspect, the present disclosure provides a video target tracking apparatus, the apparatus including: a detection map obtaining module, configured to obtain a partial detection map corresponding to a target image frame in a to-be-detected video, the partial detection map being generated based on appearance information of a target object that is in the to-be-detected video and is to be tracked by an image segmentation model; a motion map obtaining module, configured to obtain a relative motion saliency map corresponding to the target image frame, the relative motion saliency map being generated based on motion information of the target object; a constraint information obtaining module, configured to determine constraint information corresponding to the target image frame according to the partial detection map and the relative motion saliency map, the constraint information including an absolute positive sample pixel, an absolute negative sample pixel, and an undetermined sample pixel in the target image frame; a model adjustment module, configured to adjust a parameter of the image segmentation model by using the constraint information, to obtain an adjusted image segmentation model; and a target segmentation module, configured to extract the target object from the target image frame by using the adjusted image segmentation model.

A computer-readable storage medium is provided, the storage medium storing at least one instruction, at least one program, a code set or an instruction set, the at least one instruction, the at least one program, the code set or the instruction set being loaded and executed by the processor to perform: obtaining a partial detection map corresponding to a target image frame in a to-be-detected video, the partial detection map being generated based on appearance information of a target object that is in the to-be-detected video and is to be tracked by an image segmentation model; obtaining a relative motion saliency map corresponding to the target image frame, the relative motion saliency map being generated based on motion information of the target object; determining constraint information corresponding to the target image frame according to the partial detection map and the relative motion saliency map, the constraint information including an absolute positive sample pixel, an absolute negative sample pixel, and an undetermined sample pixel in the target image frame; adjusting a parameter of the image segmentation model by using the constraint information, to obtain an adjusted image segmentation model; and extracting the target object from the target image frame by using the adjusted image segmentation model Details of one or more embodiments of the present disclosure are provided in the subsequent accompanying drawings and descriptions. Other features and advantages of the present disclosure become obvious with reference to the present disclosure, the accompanying drawings, and the claims.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In one or more embodiments of the present disclosure, the term "based on" is employed herein interchangeably with the term "according to."

Figure 1A:
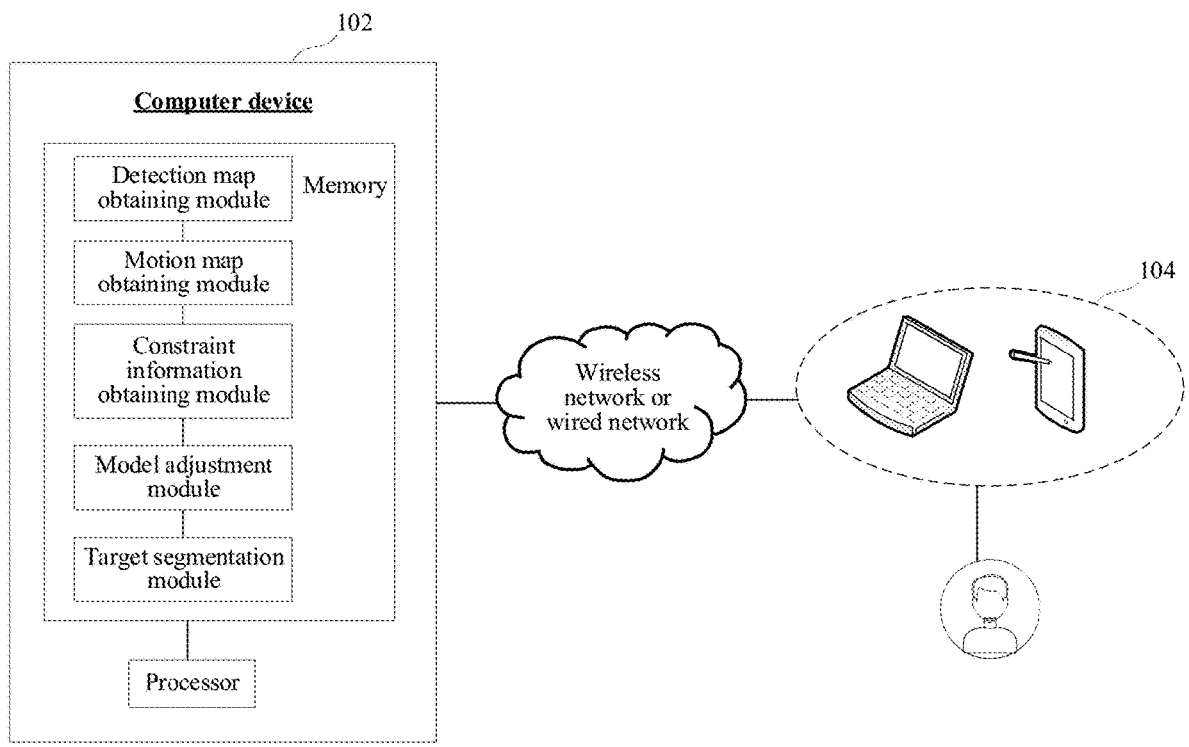
FIG. 1a is a schematic diagram of an application environment for video target tracking according to one or more embodiments of the present disclosure.

A video target tracking method provided in the present disclosure may be applied to an application environment shown in FIG. 1a. As shown in FIG. 1a, a computer device 102 communicates with a video acquisition device 104 through a network.

In one or more embodiments of the present disclosure, the term "computer device" is employed herein interchangeably with the term "computing device." The computing device may be a desktop computer, a server, a hand held computer, a smart phone, or the like.

The computer device 102 may obtain a to-be-detected video from the video acquisition device 104, to obtain a partial detection map corresponding to a target image frame in the to-be-detected video, the partial detection map being generated based on appearance information of a target object that is in the to-be-detected video and is to be tracked by an image segmentation model, and the image segmentation model being a neural network model configured to segment and extract the target object from an image frame of the to-be-detected video; obtain a relative motion saliency map corresponding to the target image frame, the relative motion saliency map being generated based on motion information of the target object; determine constraint information corresponding to the target image frame according to the partial detection map and the relative motion saliency map, the constraint information including an absolute positive sample pixel, an absolute negative sample pixel, and an undetermined sample pixel in the target image frame; adjust a parameter of the image segmentation model by using the constraint information, to obtain an adjusted image segmentation model; and extract the target object from the target image frame by using the adjusted image segmentation model.

The computer device 102 may be implemented by using an independent server or a server cluster that includes a plurality of servers. The video acquisition device 104 may include a surveillance camera or a terminal having a camera.

A video target tracking technology can be used in a plurality of different application scenarios. For example, in a security scenario, a suspect in a surveillance video can be tracked and recognized. In another example, in an application scenario of video analysis processing, an image frame including a specific person in a movie or a TV series can be extracted, so as to integrate a video segment of the specific person.

Figure 1B:
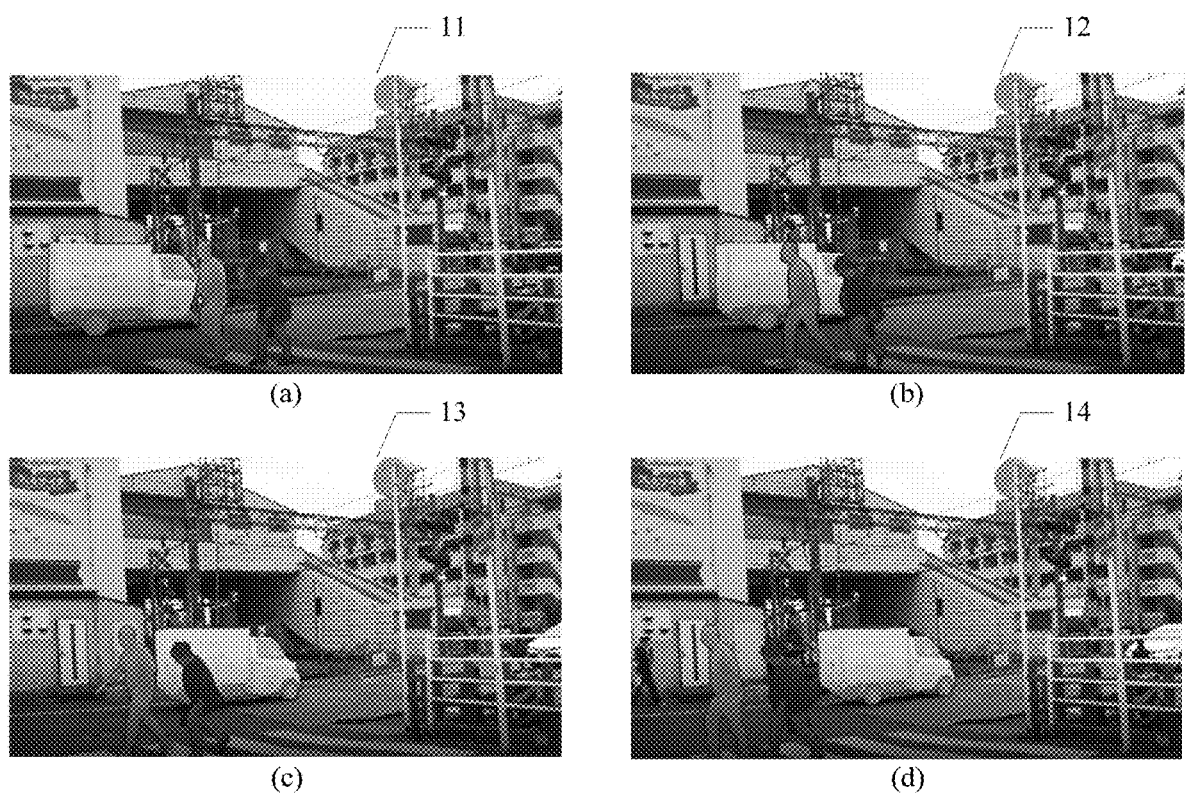
FIG. 1b is a schematic diagram of video target tracking according to one or more embodiments of the present disclosure.

FIG. 1b is an exemplary schematic diagram of video target tracking. A plurality of image frames of a video respectively marked by 11, 12, 13, and 14 are included in FIG. 1b. If persons and vehicles in the image frames of the video are tracked, an image segmentation model may be obtained through training. The image frames are inputted to the image segmentation model, for the image segmentation model to segment and extract the persons and the vehicles. For example, the person and the vehicle may be respectively marked with mask labels, so that the person and the vehicle are marked in the image frame.

In the method provided in the embodiments of the present disclosure, an execution entity of steps may be a computer device. The computer device may be any electronic device with computing, processing and storage capabilities. For example, the computer device may be a personal computer (PC) or a server, or may be a terminal device such as a mobile phone, a tablet computer, a multimedia player, a wearable device, or a smart television, or may be another device such as an unmanned aerial vehicle or an in-vehicle terminal, which is not limited in this embodiment of the present disclosure.

In the following method embodiments, for ease of description, the description is provided by merely using a computer device as the execution entity of the steps, which is not limited herein.

Figure 2:
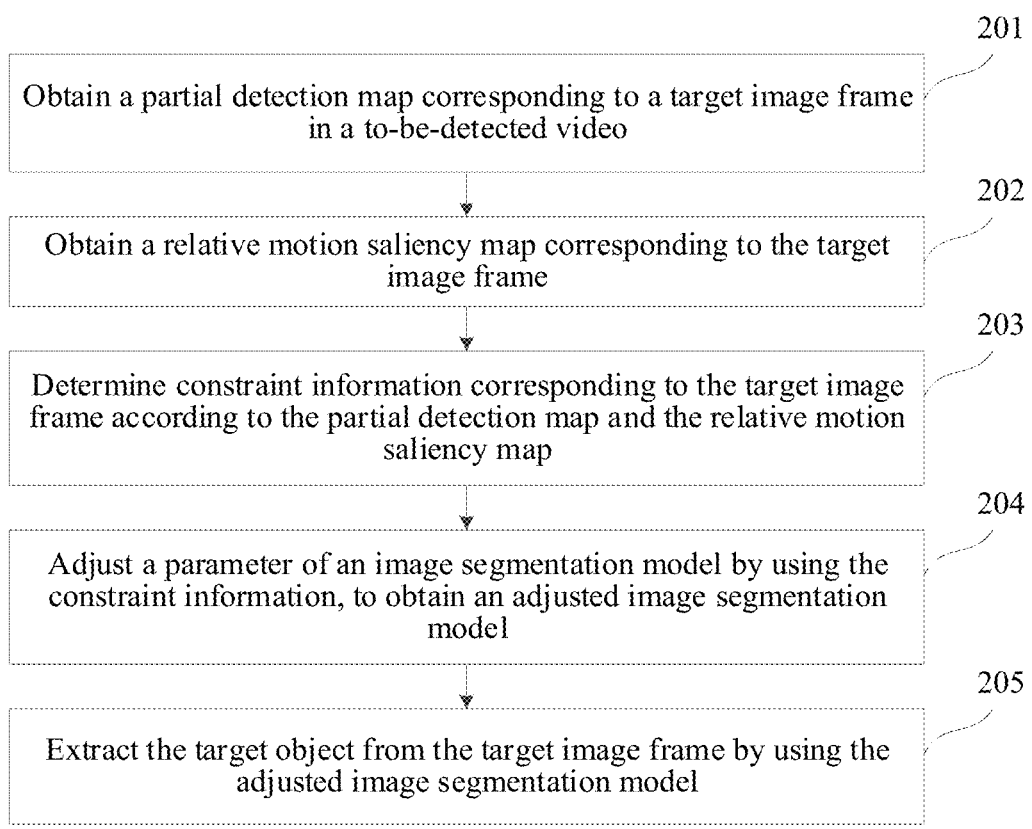
FIG. 2 is a schematic flowchart of a video target tracking method according to one or more embodiments of the present disclosure.

FIG. 2 is a flowchart of a video target tracking method according to an embodiment of the present disclosure. The method may include the following steps (201 to 205):

Step 201. Obtain a partial detection map corresponding to a target image frame in a to-be-detected video.

When the target object in the to-be-detected video is to be tracked, a specific image frame may be given to mark a mask of the target object in the image frame, and the target object is subsequently segmented and extracted from an other image frame of the to-be-detected video by using an image segmentation model. The target object may be a person or an object, which is not limited in this embodiment of the present disclosure. In certain embodiments, a mask of the target object is marked in a first image frame of the to-be-detected video, and the target object is segmented and extracted from a subsequent image frame of the to-be-detected video by using the image segmentation model. In addition, the mask of the target object may be marked in the given image frame (for example, the first image frame), and marking may be implemented manually.

The target image frame may be any image frame in the to-be-detected video and of which no target object is marked, that is, an image frame from which a target object is to be extracted by using the image segmentation model.

The partial detection map is generated based on appearance information of the target object that is to be tracked. The appearance information refers to information that can be distinguished visually, for example, a color, a shape, texture, and other information. In an exemplary embodiment, the target image frame is processed by using a target detection model to obtain the partial detection map corresponding to the target image frame. The target detection model may be a model obtained by training a convolutional neural network (CNN). A size of the partial detection map is the same as a size of the target image frame. For example, the size of the target image frame is 800*600 pixels, and the size of the partial detection map is also 800*600 pixels. In certain embodiments, a value of a target pixel in the partial detection map reflects a probability that a target pixel at the same position in the target image frame belongs to the target object. The probability is determined based on performance information of the target pixel.

In this embodiment of the present disclosure, the target object in the to-be-detected video is tracked and recognized by using the image segmentation model. The image segmentation model is a neural network model configured to segment and extract the target object from the image frame of the to-be-detected video, and the image segmentation model may be a deep learning model constructed based on a CNN. In this embodiment of the present disclosure, to ensure segmentation accuracy of the image segmentation model when tracking the target object, online adaptive training may need to be performed on the image segmentation model, to adjust a parameter of the model (for example, a weight of a neural network), and then use the adjusted image segmentation model to perform target object segmentation.

In an exemplary embodiment, this step may include the following sub-steps:

1. Select at least one training sample from a marked image frame of the to-be-detected video.

The training sample is used for training the target detection model, to adjust and optimize a parameter of the target detection model. The training sample includes the marked image frame and a detection target box corresponding to the marked image frame. The marked image frame refers to an image frame in which the mask of the target object has been marked. The marked image frame may include the image frame in which the mask of the target object is manually marked as described above, or may include the image frame in which the mask of the target object is marked by the image segmentation model.

For any marked image frame, there may be a plurality of detection target boxes corresponding to the marked image frame. One training sample includes one marked image frame and a detection target box corresponding to the marked image frame. Therefore, a plurality of training samples may be selected from the one marked image frame. The detection target box refers to an image region in which a proportion of the target object is greater than a preset threshold. It is assumed that a box is added to a specific marked image frame. In an image region in the box, a part of the image region may belong to the target object, and a part of the image region may not belong to the target object. A proportion of pixels of the part belonging to the target object in the box is calculated. If the proportion of pixels is greater than a preset threshold, the box is determined as a detection target box; otherwise, the box is not determined as a detection target box. The preset threshold may be preset according to actual requirements. For example, the preset threshold is 0.5. In addition, the foregoing box may be rectangular or another shape, which is not limited in this embodiment of the present disclosure.

In an exemplary embodiment, the training sample may be selected in the following manners: randomly scattering a box in a marked image frame; calculating a proportion of a target object in the box, determining the box as a detection target box corresponding to the marked image frame when or in response to determining that the proportion of the target object in the randomly scattered box is greater than a preset threshold, and selecting the marked image frame and the detection target box as the training sample.

2. Adjust the parameter of the target detection model by using the training sample, to obtain an adjusted target detection model.

In certain embodiments, a Faster-RCNN network is selected as a framework of the target detection model. The parameter (for example, a network weight) of the target detection model is finely adjusted by using the training sample selected above, to obtain the adjusted target detection model. For example, in a process of adjusting the parameter of the target detection model by using the training sample, a batch size may be 1, fine adjustment is performed 600 rounds, and a size and an aspect ratio of the box may both be adjusted during training, so as to finally train a relatively high-precision target detection model.

3. Process the target image frame by using the adjusted target detection model, to obtain the partial detection map.

The target image frame is inputted to the adjusted target detection model, and the partial detection map corresponding to the target image frame may be obtained.

In an exemplary embodiment, a mask of a target object in a first image frame of the to-be-detected video is obtained through manual marking, and target objects are segmented and extracted successively from image frames starting from a second image frame. If a partial detection map corresponding to an $i^{th}$ (i is an integer greater than 1) image frame in the to-be-detected video may need to be obtained, at least one training sample may be selected from the first image frame and an $(i-1)^{th}$ image frame, and a parameter of a current target detection model is adjusted by using the training sample, to obtain an adjusted target detection model. Subsequently, the $i^{th}$ image frame is processed by using the adjusted target detection model, to obtain the partial detection map corresponding to the $i^{th}$ image frame.

Step 202. Obtain a relative motion saliency map corresponding to the target image frame.

The relative motion saliency map is generated based on motion information of the target object. A position of the target object in image frames of the to-be-detected video may not be stationary, and the target object may move. For example, when the target object is a movable object such as a human, an animal, or a vehicle, a position of the movable object in the image frames of the to-be-detected video changes. The motion information reflects a movement situation of the target object, that is, a position change situation in different image frames. In an exemplary embodiment, the relative motion saliency map is determined by detecting an optical flow between neighboring image frames, and the optical flow reflects the motion information of the target object. In the field of computer vision, the optical flow refers to a movement situation of each pixel in a video image over time. The optical flow has rich motion information. Therefore, the optical flow is widely used in motion estimation, autonomous driving, and behavior recognition. A size of the relative motion saliency map is the same as that of the target image frame. For example, when the size of the target image frame is 800*600 pixels, the size of the relative motion saliency map is also 800*600 pixels. In certain embodiments, a value of a target pixel in the relative motion saliency map reflects a probability that a target pixel at the same position in the target image frame belongs to the target object. The probability is determined based on motion information of the target pixel.

In an exemplary embodiment, this step may include the following sub-steps:

1. Calculate the optical flow between the target image frame and the neighboring image frame.

The neighboring image frame refers to an image frame neighboring the target image frame in the to-be-detected video. There may be one or more neighboring image frames, which is not limited in this embodiment of the present disclosure. The neighboring image frame may include a previous image frame, or a next image frame, or a previous image frame and a next image frame. The previous image frame refers to an image frame located before the target image frame in the to-be-detected video, and the next image frame refers to an image frame located after the target image frame in the to-be-detected video. In certain embodiments, the previous image frame is an image frame before the target image frame, and the next image frame is an image frame after the target image frame. For example, the target image frame is an $i^{th}$ image frame, the previous image frame is an $(i-1)^{th}$ image frame, the next image frame is an $(i+1)^{th}$ image frame, and i is an integer greater than 1. If an optical flow between the target image frame and the previous image frame and an optical flow between the target image frame and the next image frame are comprehensively considered during calculation of optical flows corresponding to the target image frame, a better effect can be achieved.

In certain embodiments, a FlowNet2 is used as a basic model to calculate the optical flow between the target image frame and the neighboring image frame. The FlowNet2 is a model that uses a CNN to extract an optical flow, having advantages of a fast speed and high accuracy.

2. Generate the relative motion saliency map according to the optical flow.

After the optical flow corresponding to the target image frame is obtained through the foregoing step, the relative motion saliency map corresponding to the target image frame is generated according to the optical flow.

In an exemplary embodiment, the relative motion saliency map is generated in the following manners:

2.1. Determine a background optical flow according to an optical flow of a background region in the partial detection map.

The background region in the partial detection map refers to a remaining region of the partial detection map except a region in which the target object is detected. According to the partial detection map corresponding to the target image frame outputted by the target detection model, a region in which the target object is located and a background region thereof may be determined. In certain embodiments, an average of optical flows of pixels in the background region is used as the background optical flow.

2.2. Generate the relative motion saliency map corresponding to the target image frame according to the background optical flow and the optical flow corresponding to the target image frame.

In an exemplary embodiment, a difference between the optical flow of each pixel and the background optical flow is calculated by using a root mean square (RMS), to obtain the relative motion saliency map corresponding to the target image frame. In certain embodiments, to make a value of the RMS more stable, a two-norm of the optical flow may be increased, and a ratio of the two parts is 1:1, that is, a value $RMS_{m,n}$ of a pixel (m, n) in the relative motion saliency map may be calculated by using the following formula:

$$RMS_{m,n} = \|O_{m,n} - \psi\| + \|O_{m,n}\|.$$

$O_{m,n}$ is the optical flow of the pixel (m, n), and $\psi$ is the background optical flow.

Step 203. Determine constraint information corresponding to the target image frame according to the partial detection map and the relative motion saliency map.

The constraint information includes an absolute positive sample pixel, an absolute negative sample pixel, and an undetermined sample pixel in the target image frame. The absolute positive sample pixel refers to a pixel that is determined, based on the appearance information and the motion information, to belong to the target object, in the target image frame. The absolute negative sample pixel refers to a pixel that is determined, based on the appearance information and the motion information, not to belong to the target object, in the target image frame. The undetermined sample pixel refers to a pixel for which whether the pixel belongs to the target object cannot yet be determined based on the appearance information and the motion information, in the target image frame. In this embodiment of the present disclosure, the constraint information may also be referred to as a constraint flow.

In certain embodiments, for the target pixel in the target image frame, if the value of the target pixel in the partial detection map satisfies a first preset condition, and the value of the target pixel in the relative motion saliency map satisfies a second preset condition, the target pixel is determined as the absolute positive sample pixel; if the value of the target pixel in partial detection map does not satisfy the first preset condition, and the value of the target pixel in the relative motion saliency map does not satisfy the second preset condition, the target pixel is determined as the absolute negative sample pixel; and if the value of the target pixel in the partial detection map satisfies the first preset condition, and the value of the target pixel in the relative motion saliency map does not satisfy the second preset condition, or the value of the target pixel in the partial detection map does not satisfy the first preset condition, and the value of the target pixel in the relative motion saliency map satisfies the second preset condition, the target pixel is determined as the undetermined sample pixel. The first preset condition and the second preset condition may be preset according to an actual situation.

In an example, the first preset condition is that a value is greater than a first threshold, and the second preset condition is that a value is greater than a second threshold. For example, the first threshold is 0.7, and the second threshold is 0.5. The first threshold and the second threshold may be preset according to an actual situation, and the foregoing are only examples.

Step 204. Adjust a parameter of the image segmentation model by using the constraint information, to obtain an adjusted image segmentation model.

After the constraint information corresponding to the target image frame is obtained, the constraint information may be used for adaptively learning the image segmentation model and finely adjusting the parameter of the image segmentation model to improve accuracy of the image segmentation model when segmenting and extracting the target object from the target image frame.

In an exemplary embodiment, to further improve the accuracy of the image segmentation model, the absolute positive sample pixel and the absolute negative sample pixel are used for adjusting the parameter of the image segmentation model, to obtain the adjusted image segmentation model. That is, when adjusting the parameter of the image segmentation model, only the absolute positive sample pixel and the absolute negative sample pixel are considered, while the undetermined sample pixel is not considered.

In certain embodiments, a loss function of the image segmentation model may use a cross entropy loss function, and an expression of the loss function is:

$$L = -\sum_{j=Y_+} \log P(y_j = 1 \mid x) - \sum_{j=Y_-} \log P(y_j = 0 \mid x).$$

L represents a value of the loss function, x is the target image frame, y is pixel-level constraint information of the target image frame x, Y+ and Y− are the absolute positive sample pixel and the absolute negative sample pixel, and P(□) is a prediction result of the target image frame x obtained by using the image segmentation model. A difference between the expression of the loss function and an expression of a conventional loss function is that the expression of the loss function does not calculate a loss of the undetermined sample pixel. In this way, an unbelievable region may be omitted to better learn a confidence region.

Step 205. Extract the target object from the target image frame by using the adjusted image segmentation model.

After the adjusted image segmentation model is obtained, the target image frame is inputted to the adjusted image segmentation model, to segment and extract the target object from the target image frame.

Adaptive adjustment training may be performed on the image segmentation model every other image frame, or every several image frames (for example, five image frames). Considering that a change in a position of the target object in a neighboring image frame is relatively small, the adaptive adjustment training is performed on the image segmentation model every several image frames, which can reduce a calculation amount and improve processing efficiency of the entire video while ensuring that the accuracy of the model is not lost as far as possible. In addition, each adaptive adjustment training may be trained for one round or a plurality of rounds (for example, three rounds), which is not limited in this embodiment of the present disclosure.

In this embodiment of the present disclosure, the parameter of the image segmentation model is adjusted by using the constraint information. Because the constraint information combines the appearance information and the motion information of the target object, on the one hand, a problem of large appearance differences of the target object in different image frames in the to-be-detected video can be overcome, and on the other hand, error propagation in the adaptive learning process can be reduced. Through complementation of the two parts, more accurate guidance for updating a model parameter each time can be generated, thereby better constraining the process of adjusting the parameter of model.

Figure 3:
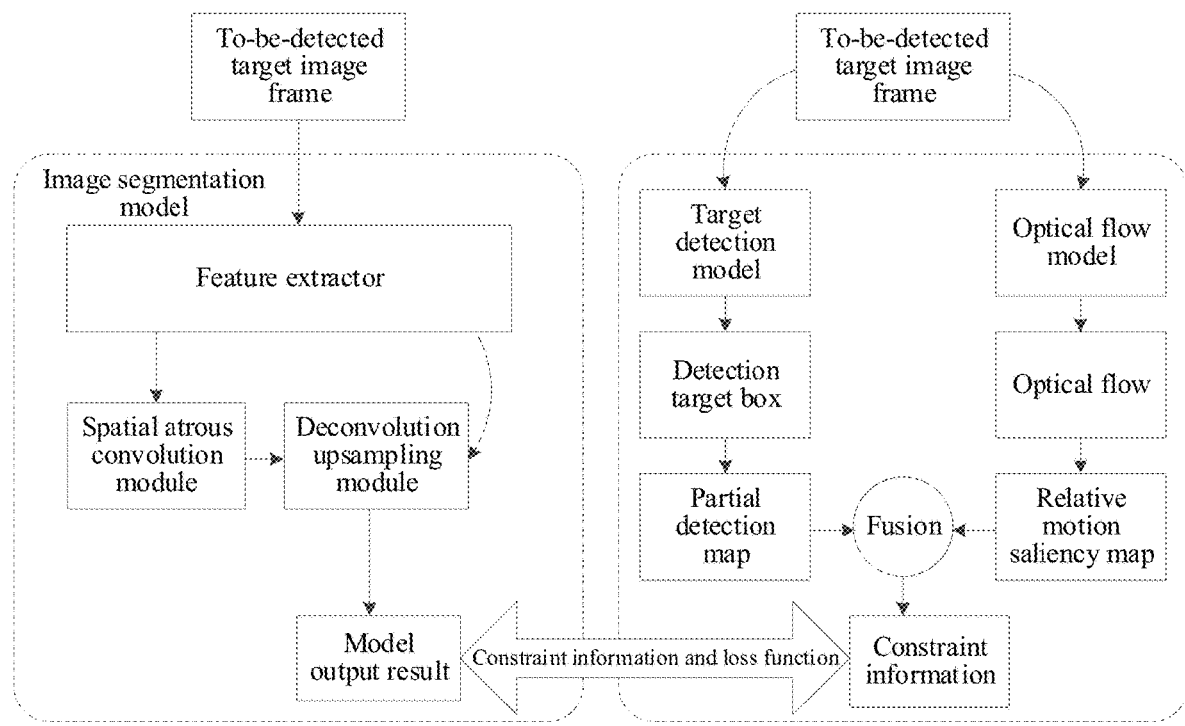
FIG. 3 is an exemplary schematic diagram of an entire procedure of technical solutions according to one or more embodiments of the present disclosure.

FIG. 3 is an exemplary schematic diagram of an entire procedure of technical solutions of the present disclosure. An example in which segmentation is performed on a target image frame in a to-be-detected video is used. A detection target box corresponding to the target image frame is extracted by using a target detection model to further obtain a partial detection map. An optical flow corresponding to the target image frame is extracted by using an optical flow model to further calculate a relative motion saliency map corresponding to the target image frame. The partial detection map and the relative motion saliency map are fused to obtain constraint information. A parameter of an image segmentation model is adjusted by using the constraint information and a loss function, to obtain an adjusted image segmentation model. Finally, the target object is extracted from the target image frame is by using the adjusted image segmentation model. The image segmentation model may include a feature extractor, a spatial atrous convolution module, a deconvolution upsampling module, and other parts. For a specific structure of the image segmentation model, refer to descriptions in the following embodiments.

Figure 4:
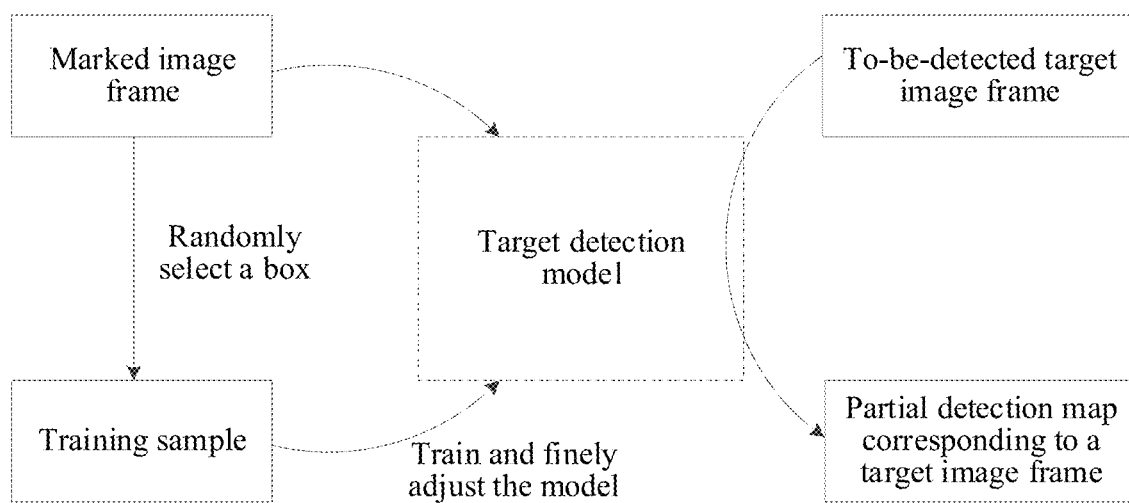
FIG. 4 is a schematic diagram of a process of adjusting a parameter of a target detection model according to one or more embodiments of the present disclosure.

In addition, FIG. 4 is an exemplary schematic diagram of a process of adjusting a parameter of a target detection model. A box is randomly selected in a marked image frame, a proportion of a target object in the box is calculated, and a training sample of the target detection model is selected according to the proportion. The parameter of the target detection model is finely adjusted by using the training sample, to obtain an adjusted target detection model. Subsequently, a target image frame is inputted to the adjusted target detection model, and a partial detection map corresponding to the target image frame is obtained.

Based on the above, in the technical solutions provided in this embodiment of the present disclosure, the parameter of the image segmentation model is adjusted by using the constraint information. Because the constraint information is obtained by combining two factors of the appearance information and the motion information of the target object, on the one hand, the problem of the large appearance differences of the target object in the different image frames in the to-be-detected video can be overcome, and on the other hand, the error propagation in the adaptive learning process can be reduced. Through complementation of the two parts, more accurate guidance for updating a model parameter each time can be generated, thereby better constraining the process of adjusting the parameter of model, so that performance of the image segmentation model after the parameter adjustment is better, and finally, accuracy of the target object segmented and extracted from the target image frame is higher.

In addition, an optical flow between a former image frame and a latter image frame is calculated to reflect motion information of the target object in the former image frame and the latter image frame, so that the motion information can be represented more accurately.

In addition, by considering only loss of the absolute positive sample pixel and the absolute negative sample pixel and excluding loss of the undetermined sample pixel when adjusting the parameter of the image segmentation model by using the constraint information, the accuracy of the image segmentation model is further increased.

In an exemplary embodiment, a pre-training process of the image segmentation model is as follows:
1. Construct an initial image segmentation model.
2. Perform preliminary training on the initial image segmentation model by using a first sample set, to obtain a preliminarily trained image segmentation model.
3. Retrain, by using a second sample set, the preliminarily trained image segmentation model, to obtain a pre-trained image segmentation model.

Figure 5:
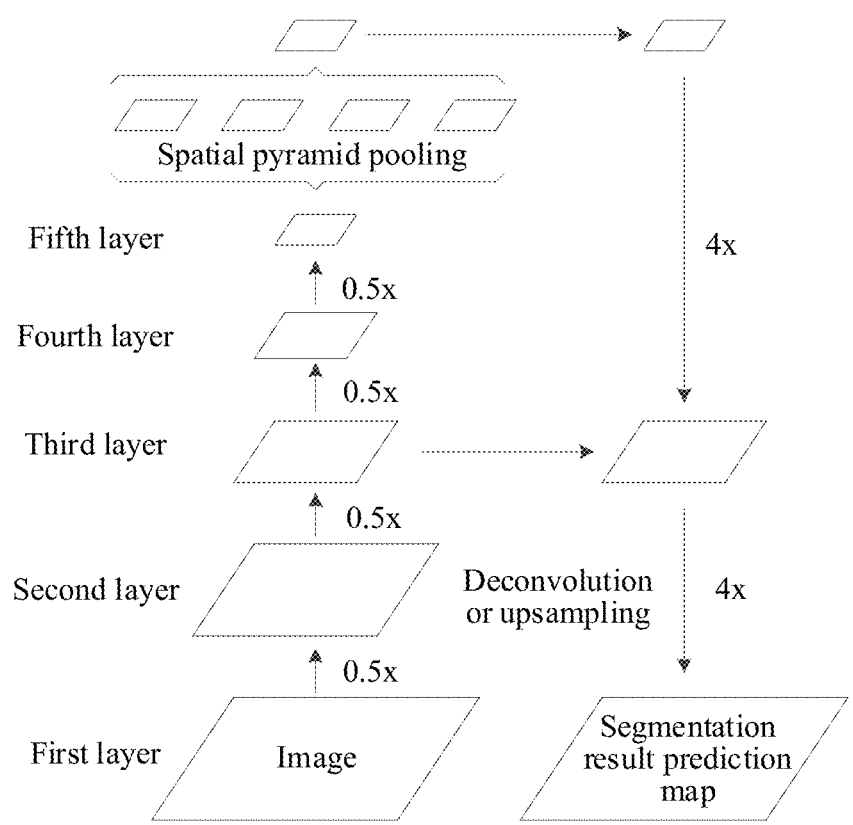
FIG. 5 is a schematic architecture of an image segmentation model according to one or more embodiments of the present disclosure.

The initial image segmentation model may be an end-to-end trainable CNN, an input of the CNN is an image, and an output of the CNN is a mask of a target in the image. In an example, a Deeplab V3+ is selected as the end-to-end trainable CNN, and after obtaining three-channel picture information inputted, the network returns a prediction mask map of the same size. FIG. 5 is an exemplary architecture of an image segmentation model. First, a ResNet CNN is used as a basic feature extractor, an atrous spatial pyramid pooling (ASPP) module is added after a ResNet CNN model at a fifth layer, atrous convolutions with different scales are used for processing and outputting features, and a feature extracted by a ResNet CNN model at a third layer is fused. In this way, segmentation prediction results at various scales may be better restored. Then, a feature learned by the network is returned to a high resolution through deconvolution or upsampling, which may effectively improve the accuracy of the image segmentation model. Corresponding to each frame in a video, the network outputs a response map of a corresponding scale. The response map is a probability prediction result of segmentation. As a network depth of a ResNet increases, corresponding feature extraction capabilities also increase accordingly, parameters of a network model may similarly increase, and a training time also increase. In this embodiment of the present disclosure, a network ResNet 101 is used as a basic network of the Deeplab V3+ feature extractor. The ASPP module is added after a basic CNN, the feature extracted by the ResNet CNN model at the third layer is simultaneously introduced, and a deconvolution process and two deconvolution upsampling modules are added, to obtain a high-resolution segmentation result prediction map.

The first sample set includes at least one marked picture, and the second sample set includes at least one marked video. For example, a Pascal VOC database is selected as the first sample set, and the Pascal VOC database includes 2913 pixel-level marked picture segmentation data. By learning semantic segmentation of an image, the image segmentation model may be better trained. During preliminary training, a batch size of 4 may be used, and training is performed 8000 rounds. For example, a DAVIS16 database is selected as the second sample set, so that the image segmentation model is suitable for a target segmentation task. The DAVIS16 database includes 50 pixel-level marked videos with a total of 3455 frames, where 30 videos are used for training and 20 videos are used for testing. In certain embodiments, in a process of training the image segmentation model, data expansion may be performed on the samples. For example, an original image is expanded to a plurality of different scales, for example, a size of the original image is scaled by 0.8 time, 1.2 times, and 1.6 times, so that the image segmentation model can be applicable to images of different scales. In certain embodiments, an initial learning rate is selected as 0.001, it is set that four samples are learned each batch, and the learning rate is reduced to $\frac{1}{10}$ of the original learning rate every 2400 rounds. A total of 6000 rounds are trained, and the pre-trained image segmentation model is finally obtained.

The pre-training process of the image segmentation model may be performed in the computer device that performs the video target tracking method described above, or may be performed in another device other than the computer device, and then be provided to the computer device by the another device, for the computer device to perform the video target tracking method by using the pre-trained image segmentation model. Regardless of whether the pre-training process of the image segmentation model is performed on the computer device or the another device, when the computer device performs video target tracking on a to-be-detected video, adaptive learning and adjustment may need to be performed on a parameter of the pre-trained image segmentation model by using the to-be-detected video, so that the image segmentation model can output an accurate segmentation result for each frame.

In an online adaptive video target tracking method, an adaptive training process is performed on the image segmentation model for each frame, to learn and adjust a parameter of the model, and the adjustment is based on a prediction result of a former frame. For example, an erosion algorithm is used to generate an absolute positive sample pixel for the prediction result of the former frame, and then a pixel outside a specific Euclidean distance of the absolute positive sample is set as an absolute negative sample pixel. Such a constraint condition is used for guiding the adjustment of the parameter of the model, and finally, the adjusted image segmentation model is used to predict a segmentation result of a to-be-detected target image frame.

Figure 6:
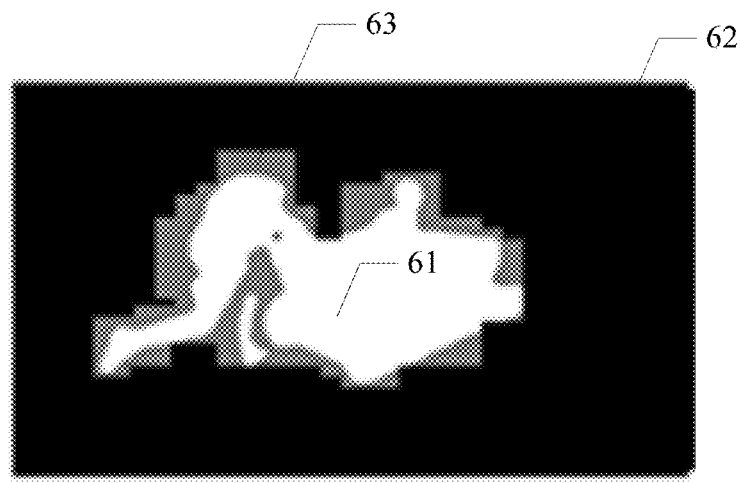
FIG. 6 is a schematic diagram of extracted samples according to one or more embodiments of the present disclosure.

Compared with the method provided in the embodiments of the present disclosure, a comparative method may rely more on accuracy of a former frame, and is more rough. Therefore, it is difficult to obtain detailed information. However, in the method provided in the embodiments of the present disclosure, the motion information and the appearance information may be better considered, and the adaptive learning process is supervised. Moreover, local details can be better maintained. By using the method provided in the embodiments of the present disclosure, the absolute positive sample pixel and the absolute negative sample pixel marked in the adaptive learning process are more accurate and reliable, and a quantity of undetermined sample pixels is less. FIG. 6 is an exemplary schematic diagram of absolute positive sample pixels, absolute negative sample pixels, and undetermined sample pixels marked in an adaptive learning process using the method provided in this embodiment of the present disclosure. In FIG. 6, pixels in a white region 61 are the absolute positive sample pixels, pixels in a black region 62 are the absolute negative sample pixels, and pixels in a gray region 63 are the undetermined sample pixels. It can be learned from FIG. 6 that a proportion of the undetermined sample pixels is small, and have more accurate and reliable edges.

According to experiments, by using the method provided in this embodiment of the present disclosure, accuracy of the constraint information may be as shown in Table-1 below:

TABLE 1

|  | Intersection-over-union (IoU %) | Proportion (%) |
| --- | --- | --- |
| Absolute positive sample | 96.8 | 14.1 |
| Absolute negative sample | 98.9 | 66.2 |
| Undetermined sample | — | 19.7 |

It can be learned from Table-1 that the constraint information obtained by using the method provided in this embodiment of the present disclosure not only includes a high accuracy rate of positive and negative samples, but also includes a small proportion of undetermined samples. Therefore, it is illustrated that the method provided in this embodiment of the present disclosure is effective. Especially for a video sequence that is not suitable for mask propagation, that is, when a to-be-tracked target object is a moving object, a result obtained by using the method provided in this embodiment of the present disclosure is more prominent. In addition, for a segmentation matter in which appearance of the target object is clear and a feature is obvious, an extremely accurate result may be obtained according to the method provided in this embodiment of the present disclosure.

In the method provided in the embodiments of the present disclosure, accuracy of video target segmentation can be significantly improved, and fusion of the motion information and appearance information of the target object, and special situations such as occlusion, large appearance changes, and background clutter in the video target segmentation are better considered. The adaptive learning process of the model can be effectively constrained, and through introduction of an optimized loss function to constrain the learning process of the model, accuracy of target segmentation in the video can be improved.

Although each step of the flowcharts in FIG. 2 is displayed sequentially according to arrows, the steps are not necessarily performed according to an order indicated by arrows. Unless clearly specified in the present disclosure, there is no strict sequence limitation on the execution of the steps, and the steps may be performed in another sequence. Moreover, at least part of the steps in FIG. 2 may include a plurality of sub-steps or a plurality of stages. These sub-steps or stages are not necessarily executed at the same time, but can be executed at different times. The order of execution of these sub-steps or stages is not necessarily performed sequentially, but may be performed in turn or alternately with other steps or at least a part of sub-steps or stages of other steps.

The following describes apparatus embodiments of the present disclosure, which can be used for executing the method embodiments of the present disclosure. For details not disclosed in the apparatus embodiments of the present disclosure, refer to the method embodiments of the present disclosure.

Figure 7:
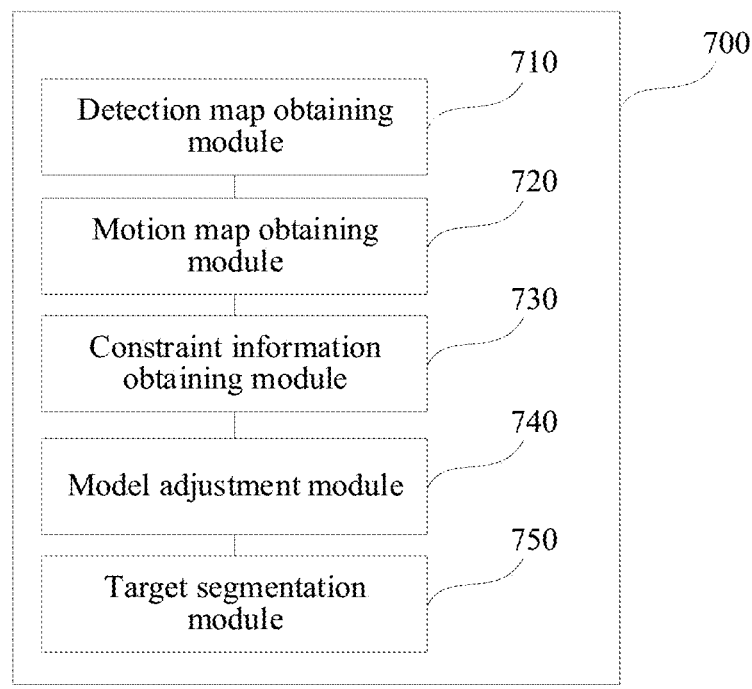
FIG. 7 is a schematic block diagram of a video target tracking apparatus according to one or more embodiments of the present disclosure.

FIG. 7 is a block diagram of a video target tracking apparatus according to an embodiment of the present disclosure. The apparatus has functions of implementing the foregoing method examples. The functions may be implemented by using hardware, or may be implemented by hardware executing corresponding software. The apparatus may be a computer device or may be disposed on a computer device. The apparatus 700 may include a detection map obtaining module 710, a motion map obtaining module 720, a constraint information obtaining module 730, a model adjustment module 740, and a target segmentation module 750.

The detection map obtaining module 710 is configured to obtain a partial detection map corresponding to a target image frame in a to-be-detected video, the partial detection map being generated based on appearance information of a target object that is in the to-be-detected video and is to be tracked by an image segmentation model, and the image segmentation model being a neural network model configured to segment and extract the target object from the image frame of the to-be-detected video.

The motion map obtaining module 720 is configured to obtain a relative motion saliency map corresponding to the target image frame, the relative motion saliency map being generated based on motion information of the target object.

The constraint information obtaining module 730 is configured to determine constraint information corresponding to the target image frame according to the partial detection map and the relative motion saliency map, the constraint information including an absolute positive sample pixel, an absolute negative sample pixel, and an undetermined sample pixel in the target image frame.

The model adjustment module 740 is configured to adjust a parameter of the image segmentation model by using the constraint information, to obtain an adjusted image segmentation model.

The target segmentation module 750 is configured to extract the target object from the target image frame by using the adjusted image segmentation model.

Based on the above, in the technical solutions provided in this embodiment of the present disclosure, the parameter of the image segmentation model is adjusted by using the constraint information. Because the constraint information is obtained by combining two factors of the appearance information and the motion information of the target object, on the one hand, the problem of the large appearance differences of the target object in the different image frames in the to-be-detected video can be overcome, and on the other hand, the error propagation in the adaptive learning process can be reduced. Through complementation of the two parts, more accurate guidance for updating a model parameter each time can be generated, thereby better constraining the process of adjusting the parameter of model, so that performance of the image segmentation model after the parameter adjustment is better, and finally, accuracy of the target object segmented and extracted from the target image frame is higher.

Figure 8:
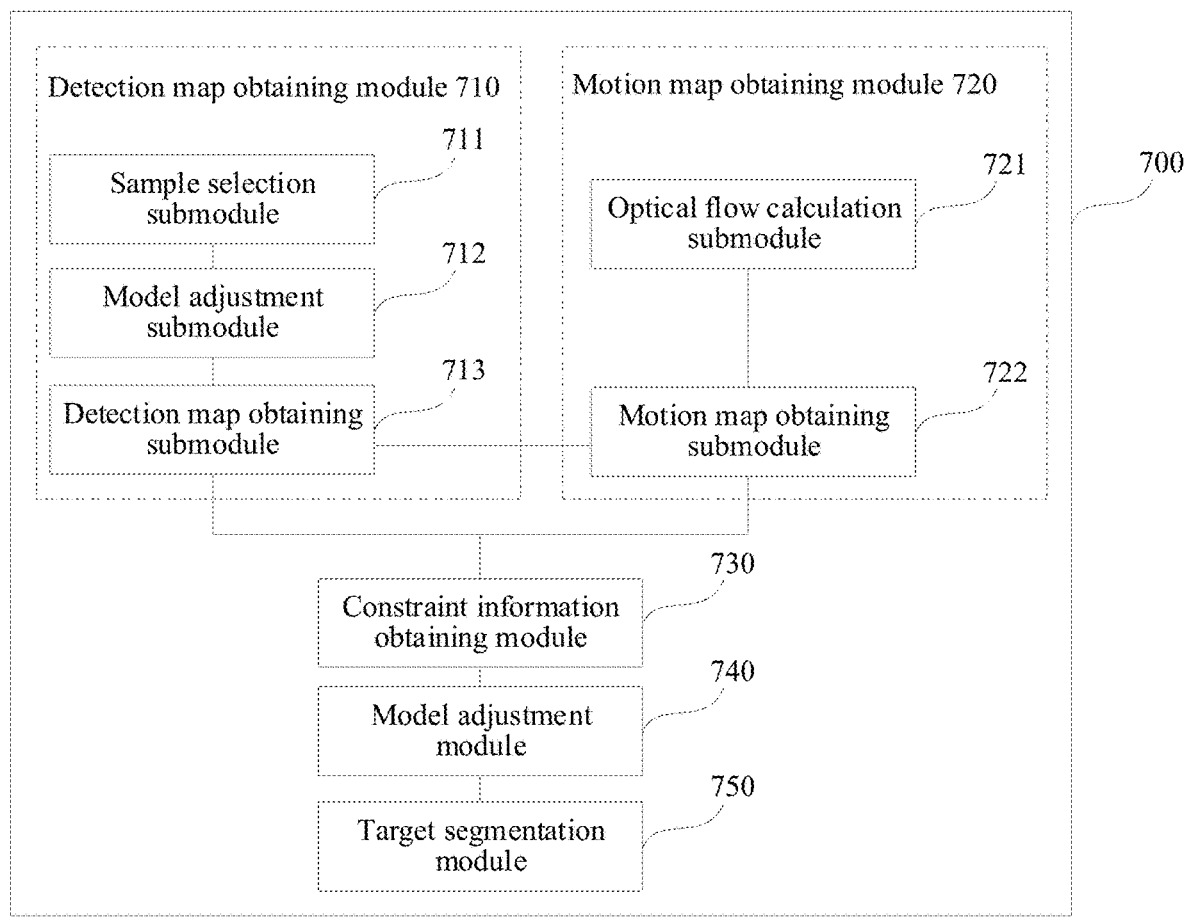
FIG. 8 is a schematic block diagram of a video target tracking apparatus according to one or more embodiments of the present disclosure.

In an exemplary embodiment, as shown in FIG. 8, the detection map obtaining module 710 includes a sample selection submodule 711, a model adjustment submodule 712, and a detection map obtaining submodule 713.

The sample selection submodule 711 is configured to select at least one training sample from a marked image frame of the to-be-detected video, the training sample including the marked image frame and a detection target box corresponding to the marked image frame, and the detection target box referring to an image region in which a proportion of the target object is greater than a preset threshold.

The model adjustment submodule 712 is configured to adjust a parameter of a target detection model by using the training sample, to obtain an adjusted target detection model.

The detection map obtaining submodule 713 is configured to process the target image frame by using the adjusted target detection model, to obtain the partial detection map.

In an exemplary embodiment, the sample selection submodule 711 is configured to: randomly scatter a box in the marked image frame; calculate a proportion of the target object in the randomly scattered box; and determine the box as the detection target box corresponding to the marked image frame when or in response to determining that the proportion of the target object in the randomly scattered box is greater than the preset threshold, and select the marked image frame and the detection target box as the training sample.

In an exemplary embodiment, as shown in FIG. 8, the motion map obtaining module 720 includes an optical flow calculation submodule 721 and a motion map obtaining submodule 722.

The optical flow calculation submodule 721 is configured to calculate an optical flow between the target image frame and a neighboring image frame.

The motion map obtaining submodule 722 is configured to generate the relative motion saliency map according to the optical flow.

In an exemplary embodiment, the motion map obtaining submodule 722 is configured to: determine a background optical flow according to an optical flow of a background region in the partial detection map, the background region in the partial detection map referring to a remaining region of the partial detection map except a region in which the target object is detected; and generate the relative motion saliency map according to the background optical flow and the optical flow corresponding to the target image frame.

In an exemplary embodiment, the constraint information obtaining module 730 is configured to: determine, for a target pixel in the target image frame, the target pixel as the absolute positive sample pixel when or in response to determining that a value of the target pixel in the partial detection map satisfies a first preset condition, and a value of the target pixel in the relative motion saliency map satisfies a second preset condition; determine the target pixel as the absolute negative sample pixel when or in response to determining that the value of the target pixel in the partial detection map does not satisfy the first preset condition, and the value of the target pixel in the relative motion saliency map does not satisfy the second preset condition; and determine the target pixel as the undetermined sample pixel when or in response to determining that the value of the target pixel in the partial detection map satisfies the first preset condition, and the value of the target pixel in the relative motion saliency map does not satisfy the second preset condition, or when or in response to determining that the value of the target pixel in the partial detection map does not satisfy the first preset condition, and the value of the target pixel in the relative motion saliency map satisfies the second preset condition.

In an exemplary embodiment, the model adjustment module 740 is configured to retrain the image segmentation model by using the absolute positive sample pixel and the absolute negative sample pixel, to obtain the adjusted image segmentation model.

In an exemplary embodiment, a pre-training process of the image segmentation model is as follows: constructing an initial image segmentation model; performing preliminary training on the initial image segmentation model by using a first sample set, to obtain a preliminarily trained image segmentation model, the first sample set including at least one marked picture; and retraining, by using a second sample set, the preliminarily trained image segmentation model, to obtain a pre-trained image segmentation model, the second sample set including at least one marked video.

When the apparatus provided in the foregoing embodiments implements functions of the apparatus, the division of the foregoing functional modules is merely an example for description. In the practical application, the functions may be assigned to and performed by different functional modules according to the requirements, that is, the internal structure of the device is divided into different functional modules, to implement all or some of the functions described above. In addition, the apparatus provided in the foregoing embodiment belongs to the same conception as the embodiment of the method. For a specific implementation process thereof, reference may be made to the method embodiment. Details are not described herein again.

Figure 9:
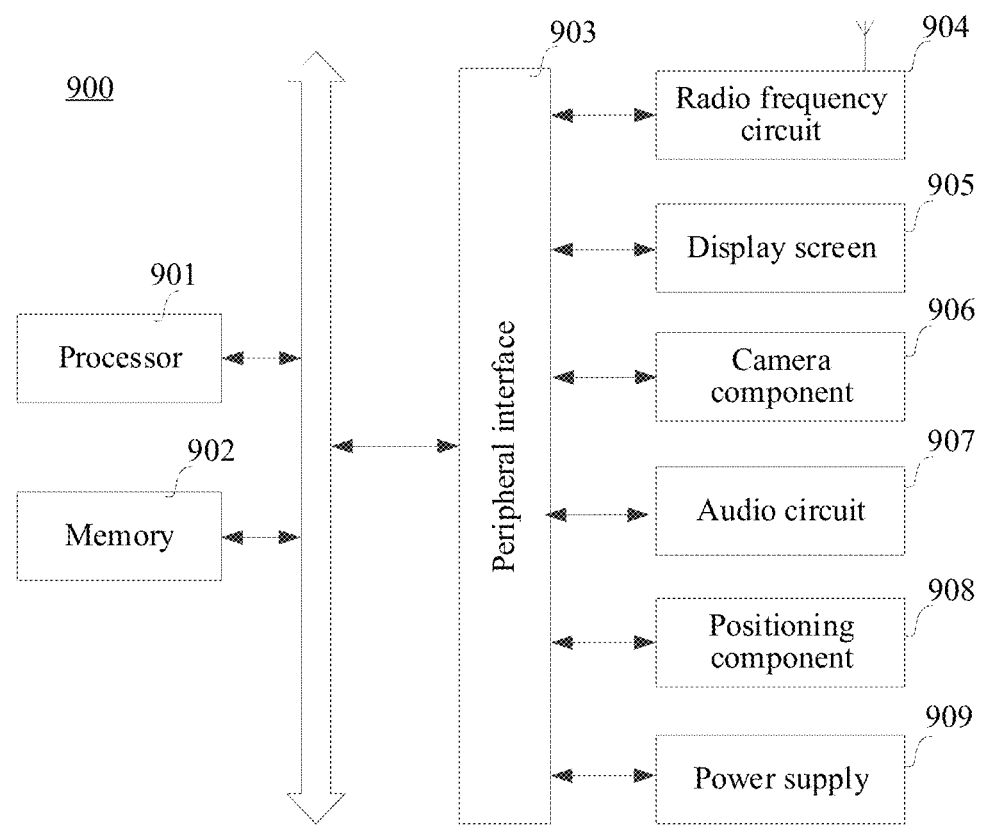
FIG. 9 is a schematic structural block diagram of a computer device according to one or more embodiments of the present disclosure.

FIG. 9 is a structural block diagram of a computer device 900 according to an embodiment of the present disclosure. The computer device 900 may be a mobile phone, a tablet computer, an ebook reader, a wearable device, a smart television, a multimedia player, a PC, a server, or the like.

Generally, the computer device 900 includes a processor 901 and a memory 902.

The processor 901 may include one or more processing cores such as a 4-core processor or an 8-core processor. The processor 901 may be implemented by using at least one hardware form of a digital signal processor (DSP), a field programmable gate array (FPGA), and a programmable logic array (PLA). The processor 901 may alternatively include a main processor and a coprocessor. The main processor is a processor configured to process data in an awake state, also referred to as a central processing unit (CPU), and the coprocessor is a low-power processor configured to process data in a standby state. In some embodiments, the processor 901 may be integrated with a graphics processing unit (GPU). The GPU is configured to be responsible for rendering and drawing content that a display screen may need to display. In some embodiments, the processor 901 may further include an artificial intelligence (AI) processor. The AI processor is configured to process a computing operation related to machine learning.

The memory 902 may include one or more computer-readable storage medium. The computer-readable storage medium may be non-transient. The memory 902 may further include a high-speed random access memory and a non-volatile memory, such as one or more magnetic disk storage devices or a flash storage device. In some embodiments, the non-transient computer-readable storage medium in the memory 902 is configured to store a computer program, and the computer program is used to be executed by the processor 901 to implement the video target tracking method provided in the method embodiments of the present disclosure.

In some embodiments, the computer device 900 may include: a peripheral interface 903 and at least one peripheral. The processor 901, the memory 902, and the peripheral interface 903 may be connected by using a bus or a signal cable. Each peripheral may be connected to the peripheral interface 903 by using a bus, a signal cable, or a circuit board. In certain embodiments, the peripheral may include: at least one of a radio frequency circuit 904, a display screen 905, a camera component 906, an audio circuit 907, a positioning component 908, and a power supply 909.

A person of ordinary skill in the art may understand that all or some of procedures of the methods in the foregoing embodiments may be implemented by a computer program instructing relevant hardware. The program may be stored in a non-volatile computer-readable storage medium. When the program is executed, the procedures of the foregoing method embodiments may be included. Any reference to a memory, a storage, a database, or another medium used in the embodiments provided in the present disclosure may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. For the purpose of description instead of limitation, the RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a RAM bus (Rambus) direct RAM (RDRAM), a direct Rambus dynamic RAM (DRDRAM), and a Rambus dynamic RAM (RDRAM).

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person skilled in the art may understand that a structure shown in FIG. 9 constitutes no limitation on the computer device 900, and the computer device may include more or fewer components than those shown in the figure, or combine some components, or use a different component deployment.

In an exemplary embodiment, a computer device is further provided, including a processor and a memory, the memory storing at least one instruction, at least one program, a code set, or an instruction set. The at least one instruction, the at least one program, the code set, or the instruction set is configured to be executed by one or more processors to implement the foregoing video target tracking method.

In an exemplary embodiment, a computer-readable storage medium is further provided, the storage medium storing at least one instruction, at least one program, a code set, or an instruction set, and the at least one instruction, the at least one program, the code set, or the instruction set, when executed by a processor of a computer device, implementing the foregoing video target tracking method.

In certain embodiments, the computer-readable storage medium may be a ROM, a RAM, a CD-ROM, a magnetic tape, a floppy disk, an optical data storage device, or the like.

In an exemplary embodiment, a computer program product is further provided, and when executed, the computer program product is used for implementing the foregoing video target tracking method.

The step numbers described in the present disclosure merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of the present disclosure.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in the present disclosure. The foregoing embodiments may only describe several implementations of the present disclosure, but are not intended to be construed as a limitation to the patent scope of the present disclosure. For a person of ordinary skill in the art, several transformations and improvements can be made without departing from the idea of the present disclosure, which all fall within the protection scope of the present disclosure. Therefore, the protection scope of the patent of the present disclosure is subject to the appended claims.

What is claimed is:

1. A video target tracking method, performed by a computer device, the method comprising:
obtaining a partial detection map corresponding to a target image frame in a to-be-detected video, the partial detection map being generated based on appearance information of a target object that is in the to-be-detected video and is to be tracked by an image segmentation model;
obtaining a relative motion saliency map corresponding to the target image frame, the relative motion saliency map being generated based on motion information of the target object, comprising:
calculating an optical flow between the target image frame and a neighboring image frame;
determining a background optical flow according to an optical flow of a background region in the partial detection map; and
generating the relative motion saliency map according to the background optical flow and the optical flow corresponding to the target image frame;
determining constraint information corresponding to the target image frame according to the partial detection map and the relative motion saliency map, the constraint information including an absolute positive sample pixel, an absolute negative sample pixel, and an undetermined sample pixel in the target image frame;

adjusting a parameter of the image segmentation model by using the constraint information, to obtain an adjusted image segmentation model; and extracting the target object from the target image frame by using the adjusted image segmentation model.

2. The method according to claim 1, wherein obtaining the partial detection map comprises:

selecting at least one training sample from a marked image frame of the to-be-detected video, the training sample including the marked image frame and a detection target box corresponding to the marked image frame, and the detection target box referring to an image region in which a proportion of the target object in the detection target box is greater than a preset threshold;

adjusting a parameter of a target detection model by using the training sample, to obtain an adjusted target detection model; and processing the target image frame by using the adjusted target detection model, to obtain the partial detection map.

3. The method according to claim 2, wherein selecting the at least one training sample comprises:

scattering a box in the marked image frame to generate a scattered box;

calculating a proportion of the target object in the randomly scattered box; and determining the box as the detection target box corresponding to the marked image frame in response to determining that the proportion of the target object in the scattered box is greater than the preset threshold, and selecting the marked image frame and the detection target box as the training sample.

4. The method according to claim 1, wherein the background region in the partial detection map refers to a remaining region of the partial detection map except a region in which the target object is detected.

5. The method according to claim 1, wherein determining the constraint information comprises:

determining, for a target pixel in the target image frame, the target pixel as the absolute positive sample pixel in response to determining that a value of the target pixel in the partial detection map satisfies a first preset condition, and a value of the target pixel in the relative motion saliency map satisfies a second preset condition;

determining the target pixel as the absolute negative sample pixel in response to determining that the value of the target pixel in the partial detection map does not satisfy the first preset condition, and the value of the target pixel in the relative motion saliency map does not satisfy the second preset condition;

determining the target pixel as the undetermined sample pixel in response to determining that the value of the target pixel in the partial detection map satisfies the first preset condition, and the value of the target pixel in the relative motion saliency map does not satisfy the second preset condition; or determining the target pixel as the undetermined sample pixel in response to determining that the value of the target pixel in the partial detection map does not satisfy the first preset condition, and the value of the target pixel in the relative motion saliency map satisfies the second preset condition.

6. The method according to claim 1, wherein adjusting the parameter of the image segmentation model comprises:

adjusting the parameter of the image segmentation model by using the absolute positive sample pixel and the absolute negative sample pixel, to obtain the adjusted image segmentation model.

7. The method according to claim 1, wherein the image segmentation model is trained by:

constructing an initial image segmentation model;

performing preliminary training on the initial image segmentation model by using a first sample set, to obtain a preliminarily trained image segmentation model, the first sample set including at least one marked picture; and retraining, by using a second sample set, the preliminarily trained image segmentation model, to obtain a pretrained image segmentation model, the second sample set including at least one marked video.

8. A video target tracking apparatus, comprising: a memory storing computer program instructions; and a processor coupled to the memory and configured to execute the computer program instructions and perform:

obtaining a partial detection map corresponding to a target image frame in a to-be-detected video, the partial detection map being generated based on appearance information of a target object that is in the to-be-detected video and is to be tracked by an image segmentation model, and the image segmentation model being a neural network model configured to segment and extract the target object from an image frame of the to-be-detected video;

obtaining a relative motion saliency map corresponding to the target image frame, the relative motion saliency map being generated based on motion information of the target object, comprising:

calculating an optical flow between the target image frame and a neighboring image frame;

determining a background optical flow according to an optical flow of a background region in the partial detection map; and generating the relative motion saliency map according to the background optical flow and the optical flow corresponding to the target image frame;

determining constraint information corresponding to the target image frame according to the partial detection map and the relative motion saliency map, the constraint information including an absolute positive sample pixel, an absolute negative sample pixel, and an undetermined sample pixel in the target image frame;

adjusting a parameter of the image segmentation model by using the constraint information, to obtain an adjusted image segmentation model; and extracting the target object from the target image frame by using the adjusted image segmentation model.

9. The apparatus according to claim 8, wherein the processor is configured to execute the computer program instructions and further perform:

selecting at least one training sample from a marked image frame of the to-be-detected video, the training sample including the marked image frame and a detection target box corresponding to the marked image frame, and the detection target box referring to an image region in which a proportion of the target object is greater than a preset threshold;

adjusting a parameter of a target detection model by using the training sample, to obtain an adjusted target detection model; and processing the target image frame by using the adjusted target detection model, to obtain the partial detection map.

10. The apparatus according to claim 8, wherein the background region in the partial detection map refers to a remaining region of the partial detection map except a region in which the target object is detected.

11. The apparatus according to claim 8, wherein the processor is configured to execute the computer program instructions and further perform:
determining, for a target pixel in the target image frame, the target pixel as the absolute positive sample pixel in response to determining that a value of the target pixel in the partial detection map satisfies a first preset condition, and a value of the target pixel in the relative motion saliency map satisfies a second preset condition;
determining the target pixel as the absolute negative sample pixel in response to determining that the value of the target pixel in the partial detection map does not satisfy the first preset condition, and the value of the target pixel in the relative motion saliency map does not satisfy the second preset condition; and
determining the target pixel as the undetermined sample pixel in response to determining that the value of the target pixel in the partial detection map satisfies the first preset condition, and the value of the target pixel in the relative motion saliency map does not satisfy the second preset condition, or in response to determining that the value of the target pixel in the partial detection map does not satisfy the first preset condition, and the value of the target pixel in the relative motion saliency map satisfies the second preset condition.

12. The apparatus according to claim 8, wherein the processor is configured to execute the computer program instructions and further perform:
adjusting the image segmentation model by using the absolute positive sample pixel and the absolute negative sample pixel, to obtain the adjusted image segmentation model.

13. The apparatus according to claim 8, wherein the processor is configured to execute the computer program instructions and further perform:
scattering a box in the marked image frame to generate a scattered box;
calculating a proportion of the target object in the randomly scattered box; and
determining the box as the detection target box corresponding to the marked image frame in response to determining that the proportion of the target object in the scattered box is greater than the preset threshold, and selecting the marked image frame and the detection target box as the training sample.

14. The apparatus according to claim 8, wherein the image segmentation model is trained by:
constructing an initial image segmentation model;
performing preliminary training on the initial image segmentation model by using a first sample set, to obtain a preliminarily trained image segmentation model, the first sample set including at least one marked picture; and
retraining, by using a second sample set, the preliminarily trained image segmentation model, to obtain a pretrained image segmentation model, the second sample set including at least one marked video.

15. A non-transitory computer-readable storage medium, storing at least one instruction, at least one program, a code set or an instruction set, the at least one instruction, the at least one program, the code set or the instruction set, when being loaded and executed by a processor, causes the processor to perform the following operations:
obtaining a partial detection map corresponding to a target image frame in a to-be-detected video, the partial detection map being generated based on appearance information of a target object that is in the to-be-detected video and is to be tracked by an image segmentation model;
obtaining a relative motion saliency map corresponding to the target image frame, the relative motion saliency map being generated based on motion information of the target object, comprising:
calculating an optical flow between the target image frame and a neighboring image frame;
determining a background optical flow according to an optical flow of a background region in the partial detection map; and
generating the relative motion saliency map according to the background optical flow and the optical flow corresponding to the target image frame;
determining constraint information corresponding to the target image frame according to the partial detection map and the relative motion saliency map, the constraint information including an absolute positive sample pixel, an absolute negative sample pixel, and an undetermined sample pixel in the target image frame;
adjusting a parameter of the image segmentation model by using the constraint information, to obtain an adjusted image segmentation model; and
extracting the target object from the target image frame by using the adjusted image segmentation model.

16. The non-transitory storage medium according to claim 15, wherein the at least one instruction, the at least one program, the code set or the instruction set, causes the processor to perform:
selecting at least one training sample from a marked image frame of the to-be-detected video, the training sample including the marked image frame and a detection target box corresponding to the marked image frame, and the detection target box referring to an image region in which a proportion of the target object in the detection target box is greater than a preset threshold;
adjusting a parameter of a target detection model by using the training sample, to obtain an adjusted target detection model; and
processing the target image frame by using the adjusted target detection model, to obtain the partial detection map.

17. The non-transitory storage medium according to claim 16, wherein the at least one instruction, the at least one program, the code set or the instruction set, causes the processor to perform:
scattering a box in the marked image frame to generate a scattered box;
calculating a proportion of the target object in the scattered box; and
determining the box as the detection target box corresponding to the marked image frame in response to determining that the proportion of the target object in the scattered box is greater than the preset threshold, and selecting the marked image frame and the detection target box as the training sample.

* * * * *